Jan. 31, 1950
O. J. J. BRACKE ET AL
2,495,689
DRIVING DEVICE FOR POWER-DRIVEN TELEPHONE
SWITCHES AND SIMILAR SWITCHING MEMBERS
Filed Oct. 8, 1947
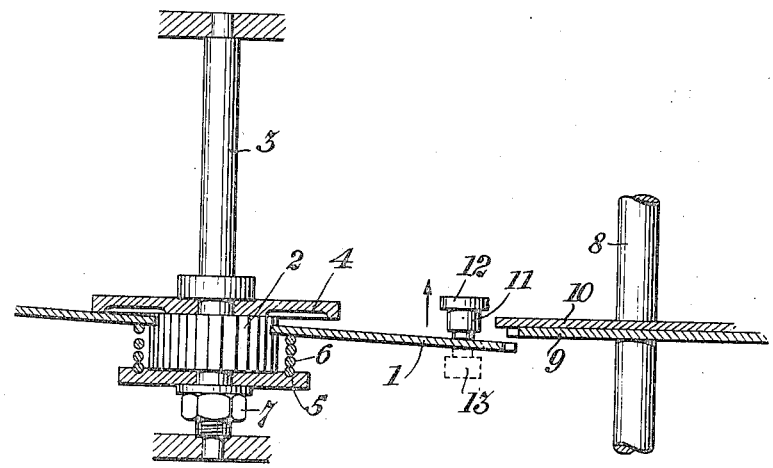
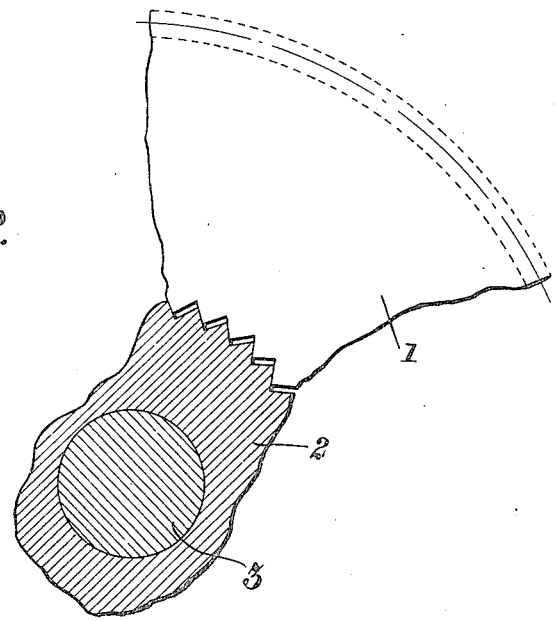
INVENTORS
OSCAR JEAN JOSEPH BRACKE
GEORGES XAVIER LENS
BY
Robert Harding Jr
ATTORNEY Patented Jan. 31, 1950

2,495,689

UNITED STATES PATENT OFFICE 2,495,689

DRIVING DEVICE FOR POWER-DRIVEN TELEPHONE SWITCHES AND SIMILAR SWITCHING MEMBERS

Oscar Jean Joseph Bracke and Georges Xavier Lens, Antwerp, Belgium, assignors to International Standard Electric Corporation, New York, N. Y., a corporation of Delaware Application October 8, 1947, Serial No. 778,634 In the Netherlands June 26, 1946

Section 1, Public Law 690, August 8, 1946 Patent expires June 26, 1966

5 Claims. (Cl. 74—405)

The present invention relates to a driving device for power driven telephone switches and similar members.

In the coupling which was usual hitherto for each switch, for example, there was mounted a non-flexible toothed wheel on a continuously driven shaft, whilst a thin toothed wheel of flexible metal was associated with a switch component to be driven, the latter toothed wheel being adapted to be brought into mesh with the first mentioned toothed wheel if the force bending the toothed wheel out of the path of the driving toothed wheel in the non-operative position of the switch was eliminated.

If the force to be transferred becomes considerable, or if the diameter of the flexible toothed wheel becomes small, the necessary thickness to be given to the toothed wheel cannot always be brought into correspondence with the desired thickness and this toothed wheel should have to have a certain resistance against wear and a sufficient flexibility for obtaining proper working.

In order to overcome this difficulty certain parts from this flexible toothed wheel have been cut away to increase the flexibility of the wheel. On account of this, the flexibility will not be the same in any angular position but this will change discontinuously. Furthermore, the strength of the disc will not be constant in every direction.

The existing structure may be improved to avoid the present drawbacks in accordance with the present invention by replacing the flexible toothed wheel by a rigid toothed wheel which may be mounted for axial displacement around a widened portion of the shaft to be driven and is pressed axially against a dish-shaped or disc-shaped member by a helical spring. The dish-shaped member is fixed on the shaft to be driven in such a manner, that under influence of this spring, the toothed wheel is brought into mesh with the driving toothed wheel, but in the inoperative position of the switch, is rocked around a circumferential portion of the dish-shaped member and out of the engagement with the driving wheel by a counter force acting on a part of the toothed wheel.

In accordance with a second characteristic feature of the invention a ring is provided with indentations or saw teeth and is mounted on the shaft to be driven. Over this ring the toothed wheel to be driven may slide, corresponding indentations on the wheel meshing with those of the ring.

Moreover the ring at the side facing the spring be bounded by a spring dish which is or is not integral with the ring.

The invention will be described with reference to the accompanying drawing, in which a single embodiment in accordance with the invention has been shown.

Fig. 1 presents a sectional side view of the switch, whilst Fig. 2 at enlarged scale shows the cooperation between the driven shaft and the toothed wheel to be driven.

In this figure the rigid toothed wheel 1 to be driven has a central aperture and slides over a dented ring 2 which is mounted on the shaft 3 to be driven. This ring is held in place between a dish shaped counter disc 4, resting against a shoulder of the shaft, and a spring dish 5 having a circumferential groove, accommodating the helical spring 6. One end of the helical spring presses against one side of the toothed wheel 1. The assembly of the disc 4, ring 2 and disc 5 is for example held in place by the nut 7.

A rigid driving toothed wheel 9 and a counter plate 10 are secured on the continuously rotated driving shaft 8. Normally the teeth of both toothed wheels cannot mesh since the toothed wheel 1 to be driven is pressed away from the driving wheel by a finger 11 of a lever arm 12 (which e. g. forms a part of the turnable armature of an electromagnet) in a rocking movement around the left hand circumferential portion of the disc 4 against a stopping member 13. As soon as the arm 12 is moved in the direction of the arrow, for example by energizing the electromagnet, the rather powerful helical spring 6 also presses the wheel 1 towards the disc 4 so that both toothed wheels can now mesh into each other. This movement of the toothed wheel 1 is bounded by the counter plate 10.

The driving of the shaft 3 therefore takes place as long as the arm 12 remains in this moved position.

When the arm 12 again is moved to the position shown either by mechanical or electrical control, the coupling is broken and the toothed wheel 1 is stopped because it is braked then between the parts 11 and 13.

The pressure with which the teeth of both toothed wheels are brought into mesh, is dependent upon the tension of the spring 6, and therefore independent of the thickness of the material of the toothed wheel 1.

The angles of the saw teeth of ring 2 are preferably chosen so that a desired centering of the toothed wheel 1 is automatically attained. This will be clear from Fig. 2.

This structure is not restricted to a minimum of thickness of the wheel 1 and it may have a value being most desirable for the working conditions. The coupling is firm, simple and reliable, whilst the wear is extremely small.

We claim:

1. A driving device for power driven switches comprising a drive shaft, a rigid toothed wheel on said drive shaft, a driven shaft, a member mounted on said driven shaft, a second toothed wheel slidably mounted axially on said driven shaft, said second toothed wheel having external teeth to mesh with the teeth on said rigid toothed wheel when said second toothed wheel is against said member, means for securing said second toothed wheel on said driven shaft against relative rotation therebetween but permitting loose axial relative movement, resilient means for holding said second toothed wheel against said member, and a movable member adapted to be pressed against said second toothed wheel for displacing said wheel out of engagement with said rigid toothed wheel against the action of said resilient means.

2. A driving device, as claimed in claim 1, in which the means for securing the second toothed wheel and driven shaft against relative rotation comprises a ring provided with indentations mounted on the driven shaft, over which the second toothed wheel may slide and corresponding indentations on the wheel.

3. A driving device, as claimed in claim 2, in which the angle of the sides of the indentations of the ring is chosen so that a proper centering of the second toothed wheel to be driven is obtained.

4. A driving device, as claimed in claim 1, in which the resilient means is a helical spring with one end against the second toothed wheel and in which a spring dish is provided on the driven shaft for holding the other end of the spring.

5. A driving device as claimed in claim 1, in which the movable member is mounted for movement adjacent the point where the drive and driven toothed wheels mesh, and movement of said member against the driven toothed wheel causes it to tilt about the edge of the first-mentioned member so that it moves out of its normal operating plane.

OSCAR JEAN JOSEPH BRACKE.
GEORGES XAVIER LENS.

REFERENCES CITED

The following references are of record in the file of this patent:

UNITED STATES PATENTS

| Number | Name | Date |
| --- | --- | --- |
| 1,133,687 | Wesley | Mar. 30, 1915 |
| 1,270,533 | Lombard | June 25, 1918 |
| 1,487,373 | Deakin | Mar. 18, 1924 |
| 2,141,422 | Thomas | Dec. 27, 1938 |
| 2,167,646 | Dyer | Aug. 1, 1939 |